(12) United States Patent
Inoue et al.

(10) Patent No.: US 6,212,276 B1
(45) Date of Patent: Apr. 3, 2001

(54) HANGING LATCH HOOK MECHANISM FOR TELEPHONES

(75) Inventors: Izumi Inoue; Michael J. Poindexter, both of New York; Sang Hoon Oh, East Hills, all of NY (US)

(73) Assignee: Coby Electronics Corporation, Maspeth, NY (US)

( * ) Notice: Subject to any disclaimer, the term of this patent is extended or adjusted under 35 U.S.C. 154(b) by 0 days.

(21) Appl. No.: 09/192,756

(22) Filed: Nov. 16, 1998

(51) Int. Cl.[7] ...................................................... H04M 1/00
(52) U.S. Cl. .......................... 379/424; 379/425; 379/428
(58) Field of Search .................................... 379/424, 425, 379/428, 435, 436

(56) References Cited

FOREIGN PATENT DOCUMENTS

2083971 * 3/1982 (GB) ..................................... 379/424

* cited by examiner

Primary Examiner—Jack Chiang

(74) Attorney, Agent, or Firm—Brown Raysman Millstein Felder & Steiner LLP

(57) ABSTRACT

An apparatus sets a telephone to an on-hook state. The telephone has a base with at least one cavity forming a cradle for a handset The telephone also has a handset with an operative surface including a mouthpiece microphone and an earpiece speaker. A first surface of the handset is opposite to the operative surface. The apparatus includes a first arm having a surface, and the first arm responds to the surface being pressed by a portion of the handset being positioned in the base. The first arm moves to actuate an on-hook switch to set the telephone to the on-hook state. The surface of the handset which presses the first arm is the operative surface or the first surface. The first arm responds to the handset having the operative surface facing away from the base. The first arm also responds to the handset being positioned entirely out of the cradle by extending from a first slot in the base. With a portion of the handset being positioned in the cradle, the first arm is moved by the portion to be retracted through the first slot into the base. A cooperative arm is pivotally coupled to the first arm, with retraction of the first arm into the base causing the cooperative arm to extend through a cooperative arm slot to engage the handset to maintain the first arm in a retracted position in the base.

28 Claims, 5 Drawing Sheets

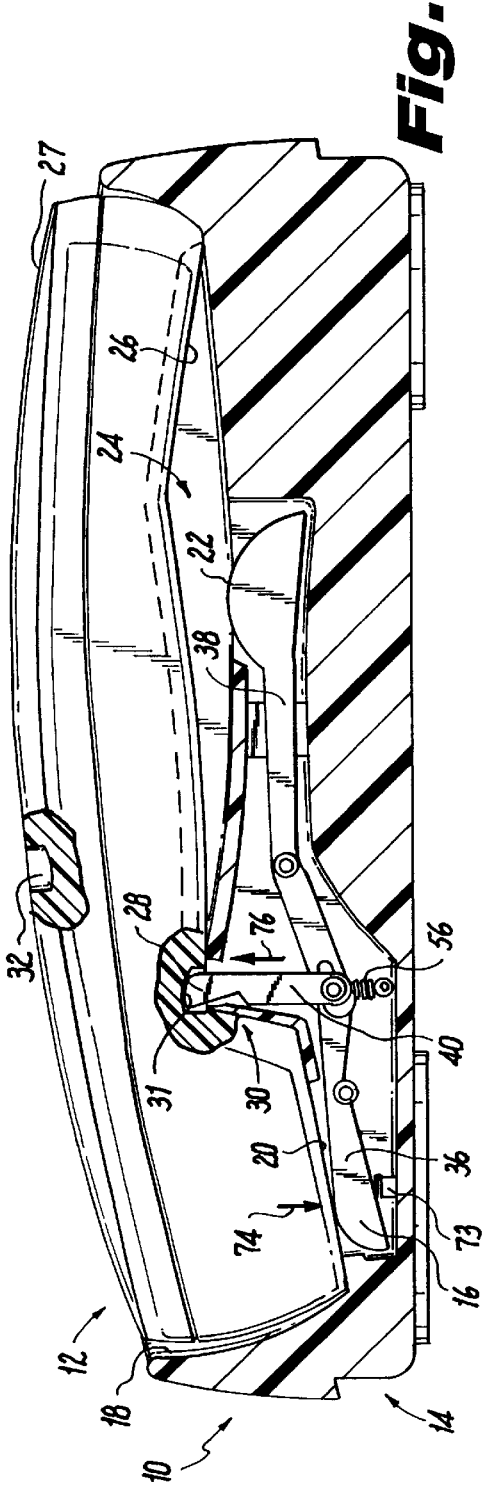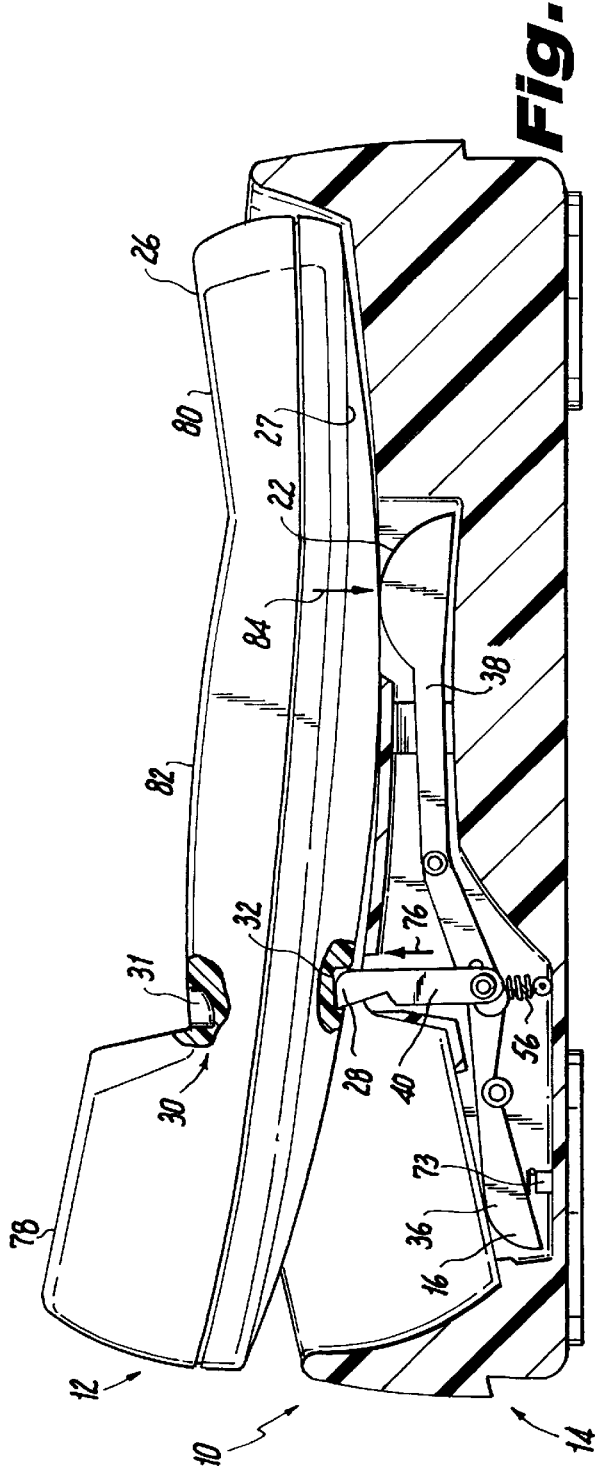

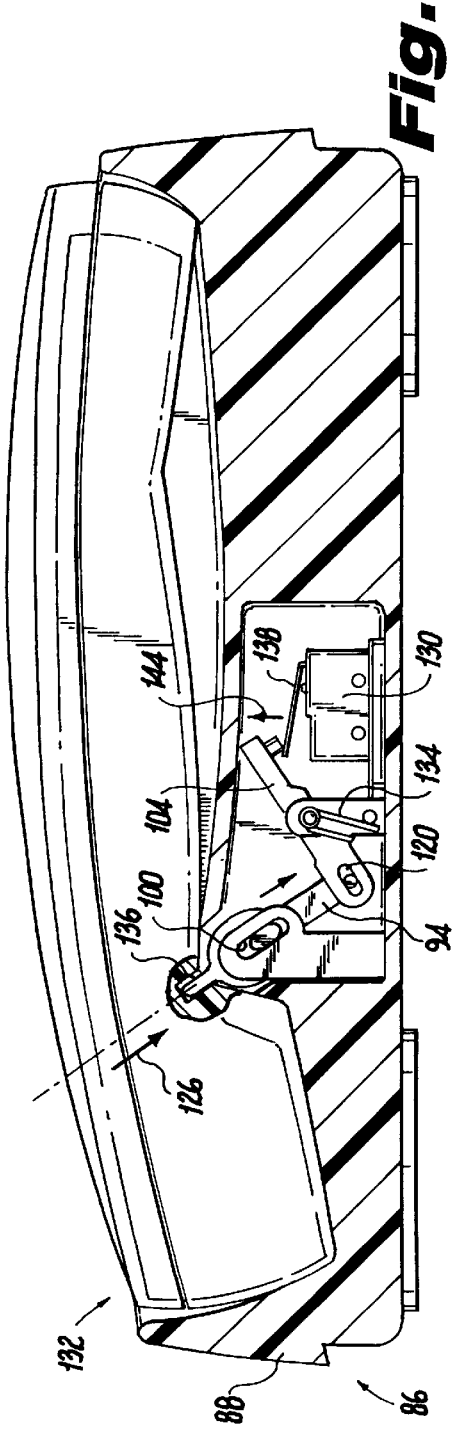
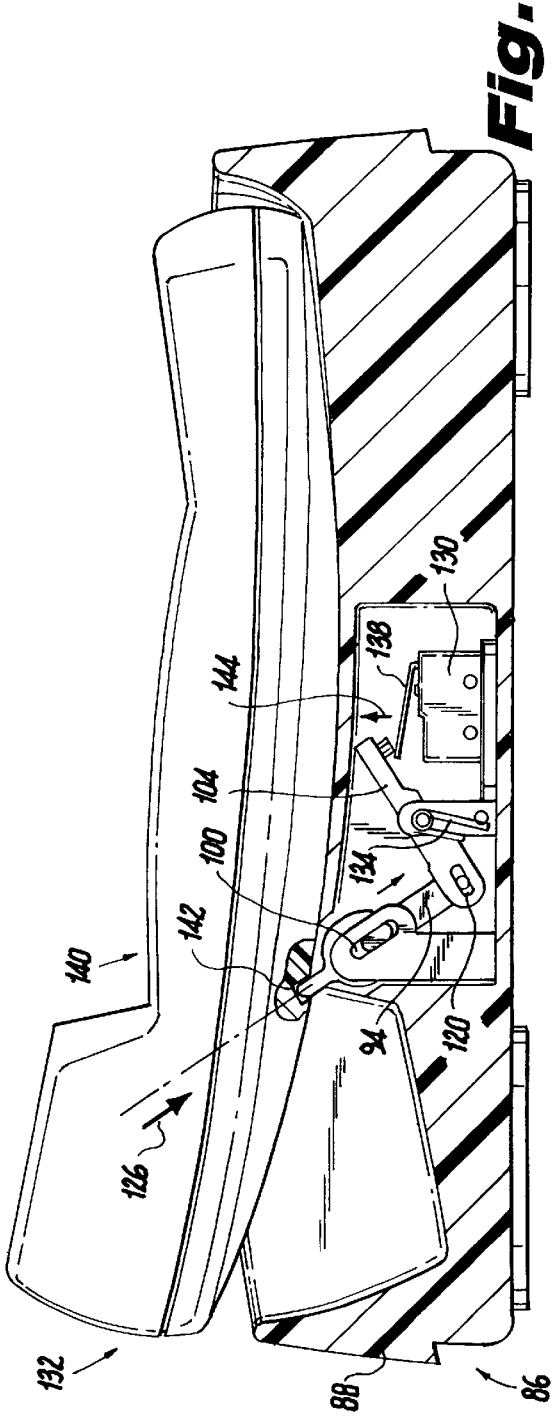

HANGING LATCH HOOK MECHANISM FOR TELEPHONES

BACKGROUND OF THE INVENTION

The present invention relates to telephones, and, more particularly, to a mechanism for setting a telephone to an on-hook state with the handset oriented in different positions.

Corded telephones, such as trim line or slim line telephones, typically require the handset to be positioned in the cradle of a base of the telephone in order to hang up the telephone. The handsets in such positions have the operative components, that is, the mouthpiece microphone, the earpiece speaker, and the numerical keypad facing toward the base, and thus inaccessible to the user when the telephone is on-hook To implement speakerphone functions, additional circuitry is required for the telephone to replace the operative components of the handset which, when on-hook, cannot be used. Accordingly, duplication of equipment and needless complexity is introduced into telephones with speakerphone functions.

Thus, there is a need to implement a speakerphone in a telephone without extra components while the handset is cradled in the base.

SUMMARY OF THE INVENTION

It is an object of the present invention to provide a telephone which may be placed on-hook in either the face up or face down positions.

It is another object of the present invention to provide a simple and inexpensive hook mechanism to a telephone base which can engage any of at least two opposing surfaces of a telephone handset.

In accordance with the invention, an apparatus sets a telephone to an on-hook state while the handset is cradled in the base. The base has at least one cavity forming the cradle for the handset. The telephone also has a handset with an operative surface including a mouthpiece microphone and an earpiece speaker. A first surface of the handset is opposite to the operative surface.

The apparatus includes a first arm having a surface, and the first arm responds to the surface being pressed by a portion of the handset being positioned in the base. The first arm moves to actuate an on-hook switch to set the telephone to the on-hook state. The portion of the handset which presses the first arm is at least the first surface. The first arm responds to the handset having the operative surface facing away from the base. The first arm also responds to the handset being positioned entirely out of the cradle by extending from a first slot in the base.

With a portion of the handset being positioned in the cradle, the first arm is moved by the portion to be retracted through the first slot into the base. A cooperative arm is pivotally coupled to the first arm, with retraction of the first arm into the base causing the cooperative arm to extend through a cooperative arm slot to engage the handset to maintain the first arm in a retracted position in the base.

In one embodiment, the apparatus has two surfaces mounted on at least one arm which extend from the base when the handset is entirely out of the cradle. One surface extends from a first slot positioned in the portion of the cradle which engages the earpiece of the handset when the handset is placed face down in the base. A second surface extends from a second slot positioned in a portion of the cradle which engages the opposing or back surface of the handset when the handset is placed face up in the base. The portion of the cradle which engages the back of the handset is contoured to match the contour of the back of the handset. In a conventional trim line corded telephone, this contour is curved.

BRIEF DESCRIPTION OF THE DRAWINGS

FIG. 3 illustrates a side cross-sectional view of the telephone of FIG. 1 with the handset in the base in the conventional orientation;

FIG. 4 illustrates a side cross-sectional view of the telephone of FIG. 1 with the handset positioned on the base with the operative portion of the handset facing away from the base;

FIG. 6 illustrates a side cross-sectional view of the telephone of FIG. 5 with the handset in the base in the conventional orientation; and FIG. 7 illustrates a side cross-sectional view of the telephone of FIG. 5 with the handset positioned on the base with the operative portion of the handset facing away from the base.

DETAILED DESCRIPTION OF THE PREFERRED EMBODIMENT

Figure 1:
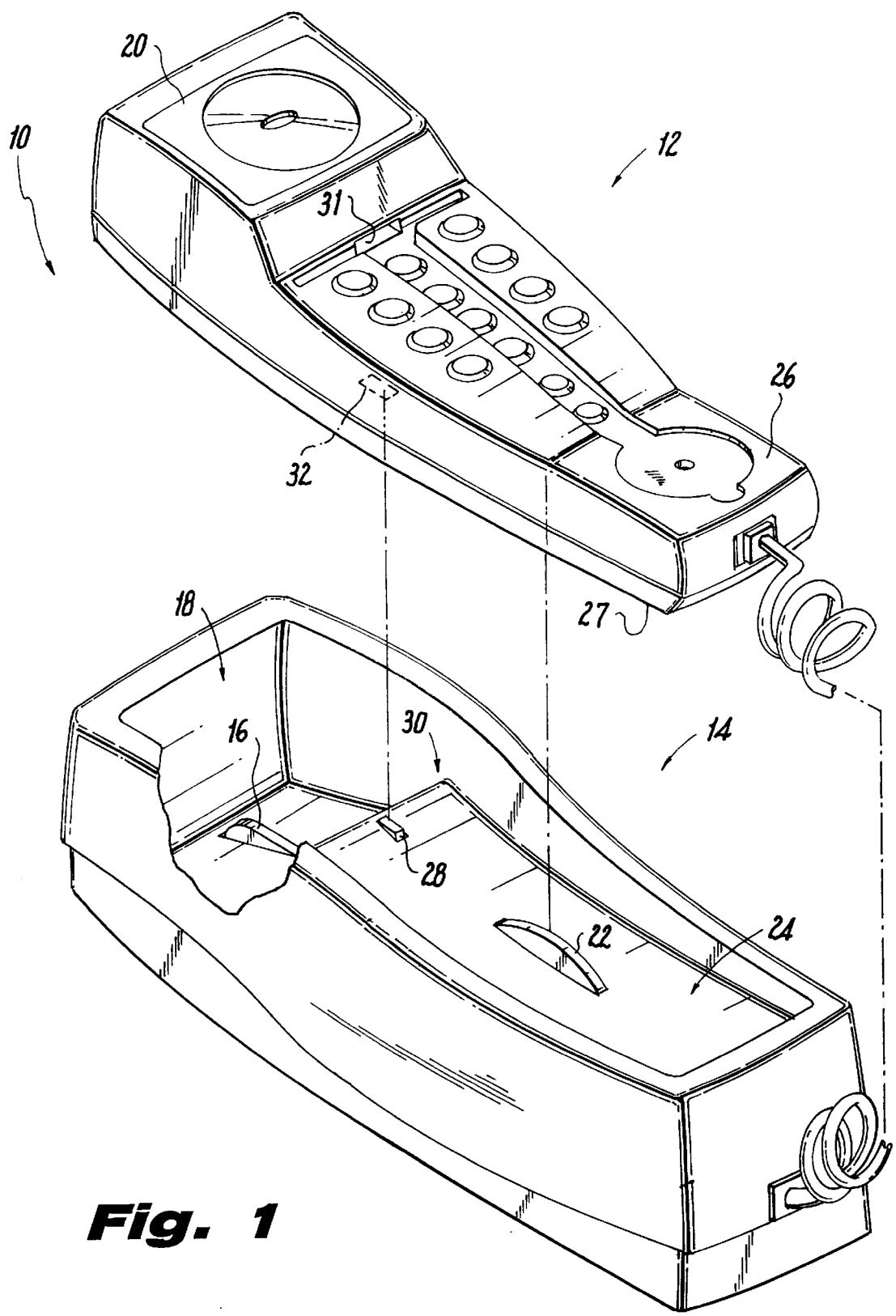
FIG. 1 illustrates a side perspective plan view of a telephone with an on-hook mechanism in its base in accordance with one embodiment of the present invention.

Referring now to FIG. 1, a telephone 10 having a handset 12 and a base 14 is disclosed which includes an on-hook mechanism for allowing the telephone to be on-hook when the handset 12 is resting on the base 14 with the operative side 26, such as the earpiece speaker, the voice/mouth microphone, and optionally the numerical keypad, oriented either face-up or face-down.

The on-hook mechanism includes a first hook surface 16 which extends into an earpiece cavity 18 of the base 14 to engage the surface 20 of the earpiece; that is, the portion of the handset 12 having the earpiece speaker, as shown in the orientation of the telephone 10 in FIG. 3. The on-hook mechanism also includes a second hook surface 22 which extends into a curved handpiece cavity 24 of the base 14 to engage the back surface 27 of a portion of the handset 12 with the back surface 27 being opposite to the operative surface 26 having the voice/mouth microphone and/or a portion of the numerical keypad. In one embodiment, the first hook surface 16 and the second hook surface 22 are curved as shown in FIG. 1 to engage the handset 12 in many orientations. For example, any portion of the handset 12 engaging any portion of the curved hook surface 16, 22 from any angle applies sufficient pressure to move the respective hook surfaces 16, 22 into the base 14. In an alternative embodiment, at least a portion of the back surface 27 is contoured to match the contour of the cavity 24 of the base 14 and so to engage the second hook surface 22.

The cavities 18, 24 form the overall cavity or cradle in which the handset 12 is disposed in a mating engagement with the base 14. The cavity 24 is contoured to match the contour of the operative surface 26 of the handset 12 in a complementary fashion. For corded, trim line telephones, the operative surface 26 and the back surface 27 of the handset 12 are curved for ease of use, such as being shaped to complement the palm of a hand when the user is holding the handset 12 in one hand. The surfaces 26–27 are also curved to complement the general shape of the side of the user's head to be held adjacent to the user's ear, cheek, and mouth.

The on-hook mechanism also includes a cooperative surface 28 which extends out of the base 14 substantially adjacent to the junction region 30 between the cavities 18, 24, as shown in FIG. 1. With the handset 12 oriented with the operative surface facing upward as shown in FIG. 1, the cooperative surface 28 may engage an aperture 32 in the back surface 27 vertically opposite to the operative surface 26 of the handset 12, such that the cooperative surface 28 may stabilize the handset 12 resting in the handpiece cavity 24.

Figure 2:
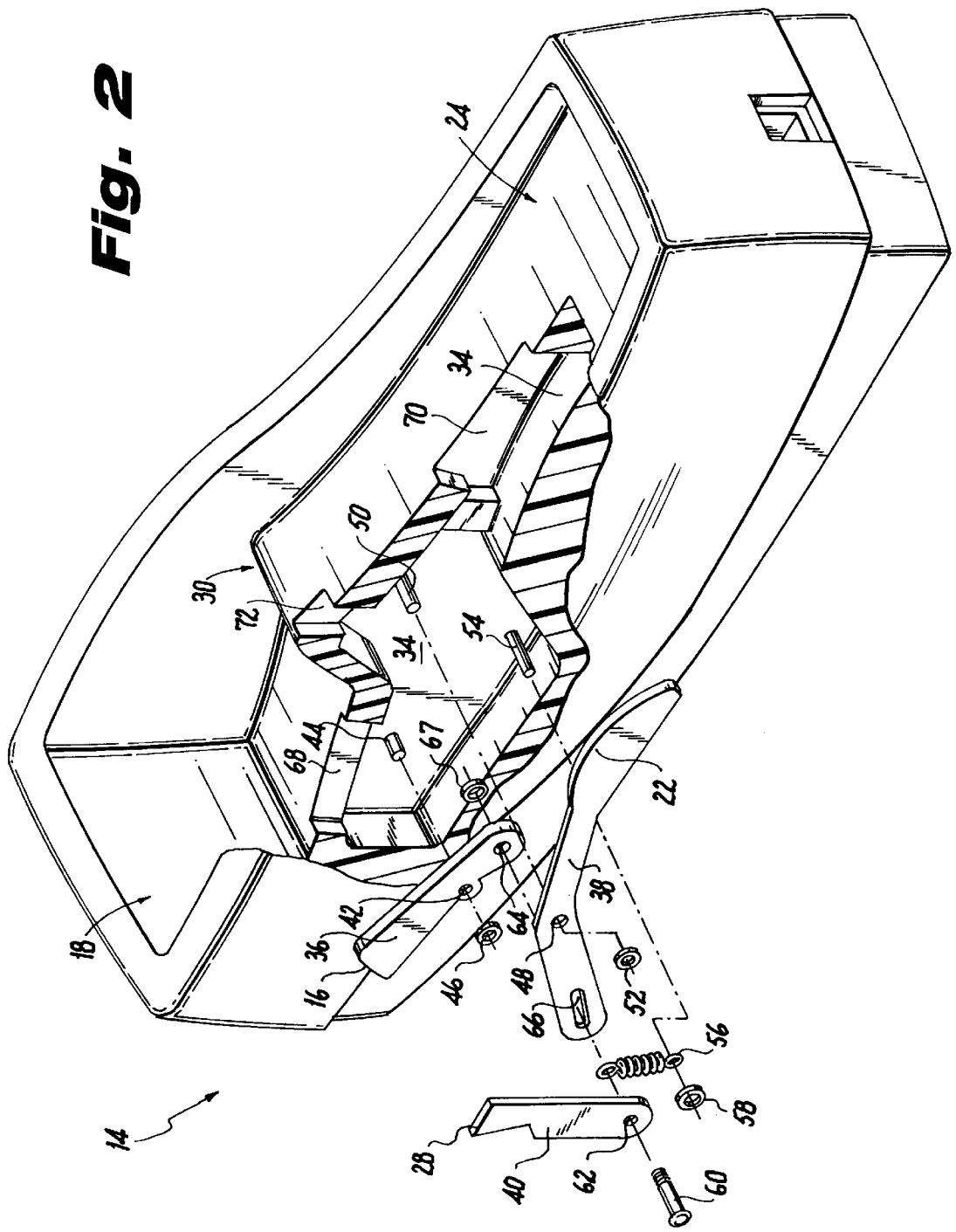
FIG. 2 illustrates an exploded side perspective cut-away view with parts separated of the telephone of FIG. 1 with the handset in the base in the conventional orientation.

As shown in FIG. 2, the base 14 of the telephone 10 includes an elongated internal cavity 34, in which are disposed a first arm 36, a second arm 38, and a cooperative arm 40 forming, in a first embodiment, the on-hook mechanism. The arms 36–40 are mounted for cooperative interaction as the handset 12 is positioned substantially adjacent to the base 14.

The first arm 36 includes the first hook surface 16 at a first end thereof. The first arm 36 also includes a first pivot aperture 42 for pivotally mounting the first arm 36 onto a first pivot peg 44 as an axle for the first arm 36 in the internal cavity 34. A first pivot element 46 is also mounted on the first pivot peg 44, and may be implemented as a washer or as a nut for securing the first arm 36 to the first pivot peg 44. Similarly, the second arm 38 includes the second hook surface 22 at a first end thereof, and also includes a second pivot aperture 48 for pivotally mounting the second arm 38 on a second pivot peg 50 as an axle for the second arm 38 in the internal cavity 34. A second pivot element 52 is also mounted on the second pivot peg 50, and may be implemented as a washer or as a nut for securing the second arm 38 to the second pivot peg 50.

In addition, a spring attaching peg 54 is provided in the base 14 and extends into the cavity 34, with a first end of a spring 56 pivotally secured to the spring attaching peg 54 by a spring attaching element 58, which may be implemented as a washer or as a nut. The second end of the spring 56 is pivotally attached to a lower end of the cooperative arm 40 by a cooperative arm engaging rod 60 extending through a cooperative aperture 62 in the lower end and through an aperture in the second end of the spring 56.

The cooperative arm engaging rod 60 further extends through a first cooperative aperture 64 in a second end of the first arm 36, and through a second cooperative aperture 66 in a second end of the second arm 38, to engage a nut 67 or other securing elements. The second cooperative aperture 66 may be a relatively elongated slot for allowing some sliding motion of the rod 60 as the arms 36–38 respectively pivot, while the cooperative arm 40 in turn moves vertically.

The base 14 further includes a first slot 68 in the earpiece cavity 18, a second slot 70 in the handpiece cavity 24, and a cooperative slot 72 in the junction region 30, through which the first hook surface 16, the second hook surface 22, and the cooperative surface 28 of the arms 36–40 respectively extend. By pivotal motion of the arms 36–38 and/or vertical motion of the cooperative arm 40, the surfaces 16, 22, 28 respectively move outward from the base 14 to an extended position, or inward into the base 14 to a retracted position. Appropriate telephone switching circuitry, such as switch 73 shown in FIGS. 3–4, is connected to at least one of the arms 36–40 and is switched as the arms 36–40 move into or out of the respective slots 68–72 to cause the telephone 10 to be either in an on-hook state or an off-hook state.

In use, the on-hook mechanism having at least the arms 36–40 operates as shown in FIGS. 3–4 to hang up the telephone 10, that is, to set the telephone 10 to an on-hook state. Referring to FIG. 3, the handset 12 is positioned in the cavities 18, 24 of the base 14 in the conventional configuration with the handset 12 mated with the base 14, that is, the contours of the operative surface of the handset 12 substantially match or mesh with the contours of the base 14. The telephone 10 incorporating the on-hook mechanism is capable of being hung up in the conventional configuration, by which the earpiece portion of the handset 12 faces downward and moves into the earpiece cavity 18 in the direction of the first downward arrow 74. The earpiece portion in turn presses down on the first hook surface 16, causing the first arm 36 to pivot in a counterclockwise direction, relative to the side view shown in FIG. 3, and then to actuate the on-hook telephone switching circuit, such as the switch 73 shown in FIGS. 3–4, by such movement of the first arm 36.

The pivotally mounted second arm 38 and the slotted second cooperative aperture 66 prevents the lower portion of the cooperative arm 40 from moving any significant distance in a counterclockwise direction and/or away from the first arm 36 in response to the pivoting of the first arm 38. Accordingly, the pivotal position of the first arm 36 is translated into vertical motion of the cooperative arm 40 in the direction of the arrow 76. Such vertical motion extends the cooperative arm 40 and its cooperative surface 28 out of the cooperative slot 72 and out of the base 14 into the junction region 30. In such an extended position, the cooperative surface 28 may perform a variety of functions. In one embodiment, the cooperative surface 28 engages and raises the middle portion of the handset 12, causing the handset 12 to rock, that is, pivot in a counterclockwise direction such that more force is conveyed by the earpiece portion of the handset 12 onto the first hook surface 16. Such additional force keeps the first arm 36 depressed as shown in FIG. 3 to ensure that the telephone 10 remains in the on-hook state.

Alternatively or in addition to pivoting the handset 12, the cooperative surface 28 functions as a retention edge when the telephone 10 is configured to be mounted on a vertical surface, for example, to hang vertically on a wall. The edge formed by the cooperative surface 28 may then engage a retention slot 31 in the operative surface 26, shown in FIGS. 1 and 3, or may engage the aperture 32 in the back surface 27 of the handset 12, shown in FIG. 1–2. Thus, the arms 36–40 engaging the handset 12 form a hanging latch hook mechanism for the vertically oriented telephone 10.

The retention slot 31 is positioned in the operative surface 26 to be substantially adjacent to the junction region 30 of the base 14 when the operative surface 26 is facing the base 14 and substantially adjacent to the base 14 when the handset 12 is in the cradle. Similarly, the aperture 32 is positioned in the back surface 26 to be substantially adjacent to the junction region 30 of the base 14 when the back surface 26 is facing the base 14 and substantially adjacent to the base 14 when a portion of the handset 12 is in the cradle, as shown in FIG. 3.

With the cooperative surface 28 in either the retention slot 31 or the aperture 32, as shown in FIGS. 2–3, respectively, the cooperative surface 28 prevents the handset 12 from accidentally falling out of one or both of cavities 18, 24 and disengaging the base 14, and thus removing the pressure from the hook surfaces 16, 22 to unintentionally place the telephone 10 in the off-hook state. In alternative embodiments, the handset 12 may have one or both or none of the apertures 31, 32 shown in FIGS. 1 and 3–4.

When the handset 12 is removed from the base 14, the downward force on the first hook surface 16 of the first arm 36 is removed, and the spring 56 causes the first arm 36 to pivot in a clockwise direction such that the first hook surface 16 moves upward to extend through the first slot 68 as shown in FIG. 1.

With the handset 12 positioned as shown in FIG. 3, the on-hook mechanism still permits the telephone on-hook switching circuitry 73 or other such switching circuitry to be toggled to enter a speakerphone operational configuration by activation of a speakerphone button (not shown). Accordingly, when the speakerphone function is not activated, the on-hook mechanism with the first arm 36 depressed, as shown in FIG. 3, maintains the telephone 10 in the on-hook position.

In an alternative embodiment, the on-hook mechanism shown in FIGS. 1–2 permits the telephone 10 to be hung up while the operative surface of the handset 12 facing away from the base 14 and the cavities 18, 24 thereof. Accordingly, in the configuration of the telephone 10 shown in FIGS. 1 and 4, the earpiece speaker 78, the mouthpiece microphone 80, and the optional numerical keypad 82 are oriented away from the base 14 and toward a telephone user, and the telephone 10 is set to the on-hook state by the on-hook mechanism of FIGS. 1–2.

Referring to FIG. 4, the on-hook mechanism causes the telephone 10 to be on-hook due to the positioning of the handpiece surface 26 in the cradle formed by the cavities 18, 24 of the base 14. The downward movement of the handpiece surface 26 in the direction of the second downward arrow 84 presses down on the second hook surface 22, causing the second arm 38 to pivot in a clockwise direction, relative to the side view shown in FIG. 4, and then to actuate an on-hook telephone switching circuit by such movement of the second arm 38. The second arm 38 may, in one embodiment, actuate the switch 73 by pivoting the first arm 36, or alternatively by actuating another switch (not shown) to place the telephone 10 in the on-hook state.

The pivotally mounted first arm 36 and the slotted second cooperative aperture 66 prevents the lower portion of the cooperative arm 40 from moving any significant distance in a clockwise direction and/or away from the second arm 38 in response to the pivoting of the second arm 38. Accordingly, the pivotal position of the second arm 38 is translated into vertical motion of the cooperative arm 40 in the direction of the arrow 76. Such vertical motion extends the cooperative arm 40 and its cooperative surface 28 out of the cooperative slot 72 into the junction region 30. In such an extended position, the cooperative surface 28 may engage the aperture 32 and perform a variety of functions. In one embodiment, the cooperative surface 28 in the aperture 32 engages and raises the middle portion of the handset 12, causing the handset 12 oriented as shown in FIG. 4 to rock, that is, pivot in a clockwise direction such that more force is conveyed by the handpiece portion and the handpiece surface 26 thereof onto the second hook surface 22. Such additional force keeps the second arm 38 depressed as shown in FIG. 4 to ensure that the telephone 10 remains in the on-hook state.

Alternatively or in addition to pivoting the handset 12, the cooperative surface 28 functions as a retention edge engaging the aperture 32 when the telephone 10 is configured to be mount on a vertical surface, for example, to hang vertically on a wall. The edge formed by the cooperative surface 28 may then engage the aperture 32 as a retention slot in the surface opposite to the operative surface of the handset 12, to prevent the handset 12 from accidentally falling out of the cavity 24 and away from the base 14, and so disengaging the handset 12 from the base 14 to unintentionally place the telephone 10 in the off-hook state.

When the handset 12 is removed from the base 14, the downward force on the second hook surface 22 of the second arm 38 is removed, and the spring 56 causes the second arm 38 to pivot in a counterclockwise direction such that the second hook surface 22 moves upward to extend through the second slot 70 as shown in FIG. 1.

With the handset 12 positioned as shown in FIG. 4, the on-hook mechanism still permits the telephone on-hook switching circuitry 73 to be toggled to enter a speakerphone operational configuration by activation of a speakerphone button (not shown), which may be one of the buttons on the keypad 82. In this configuration, the earpiece speaker 78 and the mouthpiece microphone 80 of the handset 12 may substitute for separate speaker/microphone circuitry, and the keypad 82 may substitute for a separate speakerphone activation button. Accordingly, the construction and implementation of a speakerphone in conjunction with the telephone 10 is significantly reduced, since the ability to set the handset 12 in the orientation shown in FIG. 4 permits existing components of the handset 12 to replace and remove the need for extra circuitry to implement a speakerphone.

When the speakerphone function is not activated, the on-hook mechanism with the second arm 38 depressed, as shown in FIG. 4, maintains the telephone 10 in the on-hook position. Thus, the configuration of the telephone 10 as shown in FIG. 4 further improves the use of the telephone 10 since the user can hang up the telephone 10 but need not expend extra time to reorient the handset 12 into the conventional configuration shown in FIG. 3. That is, out of the possible rotational orientations of the handset 12 to engage the base 14, the user is provided with more than one proper orientation to hang up the telephone 10, that is, the two configurations shown in FIGS. 3–4.

Figure 5:
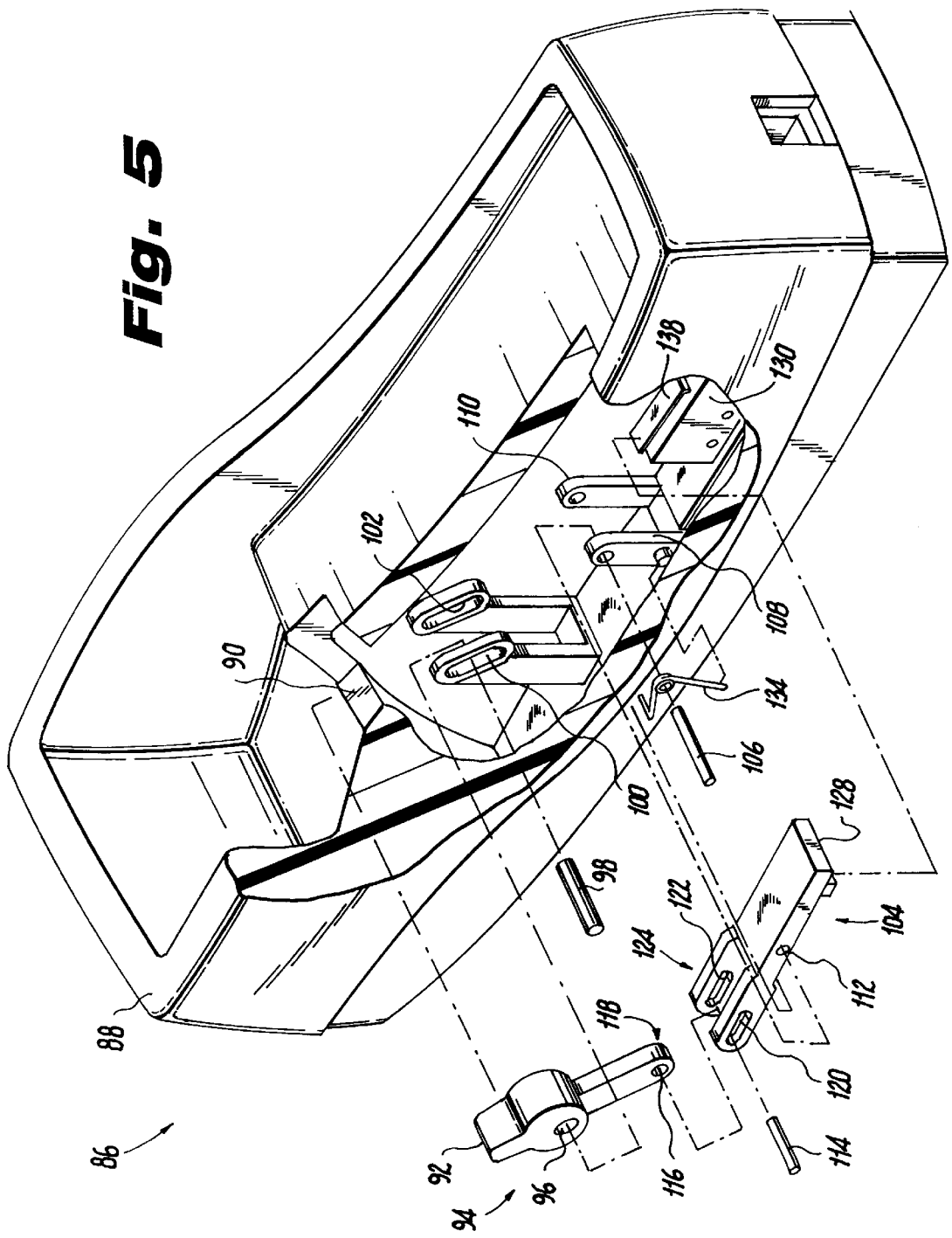
FIG. 5 illustrates an exploded side perspective cut-away view with parts separated of an alternative embodiment of a telephone with an on-hook mechanism.

In an alternative embodiment shown in FIGS. 5–7, a telephone 86 has a base 88 with a single slot 90 through which a first end 92 of a first arm 94 extends. The first arm 94 includes a first aperture 96 into which is disposed a first sliding post 98, such that the ends of the sliding post 98 slidably engage a pair of slots 100, 102 positioned within the base 88. Accordingly, the first arm 94 has a predefined and limited range of motion to slide out of and into the slot 90 to project from or to be retracted in the base 88, respectively.

A second arm 104 is provided which is pivotally disposed in the base 88 by a pivot peg 106 mounted to pivot posts 108, 110 and disposed within a pivot aperture 112 of the second arm 104. A second sliding post 114 slidably and pivotally connects the arms 94, 104 through a pivot aperture 116 of the second end 118 of the first arm 94, and through slots 120, 122 in a first end 124 of the second arm 104. Longitudinal movement of the first arm 94 along the first direction 126 shown in FIGS. 6–7 is translated into pivotal motion of the second arm 104 such that a second end 128 of the second arm 104 engages an actuation switch 130, which in turn toggles the telephone 86 into and out of the on-hook state.

To ensure that the first arm 94 extends out of the slot 90 when the handset 132 is not present, the on-hook mechanism may also include a resilient member, such as a spring 134, for providing a restorative force to the first arm 94.

As shown in FIG. 6, the handset 132 engages the base 88 in the conventional manner. A slot 136 in the operative surface of the handset 132 engages the first arm 94 to move in the direction of the arrow in the first direction 126, which in turn pivots the second arm 104 in a counterclockwise direction, relative to the side view of FIG. 6. An arm 138 of the switch 130 is then raised and/or allowed to rise in the second direction 144, that is, the arm 138 may itself be biased to move upward. Such movement of the arm 138 toggles the switch 130 to set the telephone 86 to the on-hook condition. Conversely, removal of the handset 132 from the base 88 moves the first arm 94 to move in a direction opposite to the first direction 126, which in turn pivots the second arm 104 in a clockwise direction, relative to the side view of FIG. 6. The arm 138 of the switch 130 is then lowered and/or allowed to lower. Such movement of the arm 138 toggles the switch 130 to set the telephone 86 to the off-hook condition.

In addition, the first end 92 of the first arm 94 may function to engage the slot 136 and so to retain the handset 132 in the base 88 when the telephone 86 is oriented vertically, as described above for the embodiment shown in FIG. 3.

As in the implementation shown in FIGS. 1–4, the telephone 86 in the alternative embodiment shown in FIGS. 5–7 allows the handset 132 to engage the base 88 such that the operative surface 140 of the handset 132 faces the user and faces away from the base 88 to provide speakerphone functions as described above with reference to FIG. 4. A slot 142 in the surface opposite to the operative surface 140 engages the first arm 94 to move in the direction of the arrow in the first direction 126, which in turn pivots the second arm 104 in a counterclockwise direction, relative to the side view of FIG. 7. The arm 138 of the switch 130 is then raised and/or allowed to rise in the second direction 144, which toggles the switch 130 to set the telephone 86 to the on-hook condition. Conversely, removal of the handset 132 from the base 88 moves the first arm 94 to move in the direction opposite to the first direction 126, which in turn pivots the second arm 104 in a clockwise direction, relative to the side view of FIG. 7. The arm 138 of the switch 130 is then lowered and/or allowed to lower. Such movement of the arm 138 toggles the switch 130 to set the telephone 86 to the off-hook condition.

In addition, the first end 92 of the first arm 94 may function to engage the slot 142 and so to retain the handset 132 in the base 88 when the telephone 86 is oriented vertically, as described above for the embodiment shown in FIG. 4. In alternative embodiments, the handset 132 may include one or both or none of the slots 136, 142 shown in FIGS. 6–7.

By the foregoing a novel and unobvious on-hook mechanism and method have been disclosed by way of the preferred embodiment However, numerous modifications and substitutions may be had without departing from the spirit of the invention. For example, while the preferred embodiment discusses responding to the handset being oriented in two orientations for speakerphone use, it is wholly within the preview of the invention to contemplate additional slots in the handset in different orientations about an axis to allow the handset to be oriented on its side while placing the telephone in the on-hook state in the manner as set forth above. Accordingly, the invention has been described by way of illustration rather than limitation.

What is claimed is:

1. An apparatus for setting a hook switch of a telephone to an on-hook state, the telephone having a handset and a base with at least one cavity forming a cradle for the handset, the handset having an operative surface including a mouthpiece microphone and an earpiece speaker, the handset having a first surface opposite to the operative surface, the apparatus comprising:

a first arm having a first hook surface wherein the first arm, responsive to the first hook surface being pressed by a portion of the handset when the handset is positioned in the cradle, moves to actuate the hook switch to set the telephone to the on-hook state; and wherein the portion of the handset includes the first surface of the handset.

2. The apparatus of claim 1, wherein the first arm is responsive to the handset being positioned in the cradle with the operative surface oriented away from the base.

3. The apparatus of claim 1, wherein the first arm, responsive to the handset being positioned entirely out of the cradle, extends from a first slot in the base.

4. The apparatus of claim 3, wherein the first arm, responsive to the portion of the handset being positioned in the cradle, is moved by the portion whereby the first arm is retracted through the first slot into the base to actuate the hook switch to the on-hook state.

5. The apparatus of claim 4, further comprising:

a cooperative arm pivotally coupled to the first arm, wherein retraction of the first arm into the base causes the cooperative arm to extend through a cooperative arm slot in the base to engage the handset.

6. The apparatus of claim 5, wherein the cooperative arm in the extended position pivots the handset to apply pressure to the first hook surface to maintain the first arm in the retracted position in the base.

7. The apparatus of claim 5, wherein the cooperative arm in the extended state and engaging the handset retains the handset substantially adjacent to the base when the base is mounted on a vertical surface.

8. The apparatus of claim 3, further comprising:

a second arm having a second hook surface which, in response to the handset being positioned entirely out of the cradle, extends from a second slot in the base.

9. The apparatus of claim 8, wherein the second slot is positioned in a portion of the base wherein, when the portion of the handset is positioned in the cradle substantially adjacent to the second slot, the second hook surface engages the first surface of the handset.

10. The apparatus of claim 1, wherein the portion of the handset that moves the first arm to actuate the on-hook switch to set the telephone to the on-hook state includes the operative surface.

11. The apparatus of claim 1, further comprising:

a second arm pivotally mounted within the base and engaging the first arm and the hook switch; and wherein motion of the first arm by the pressure from the portion of the handset is transformed to pivoting motion of the second arm to switch the hook switch between the on-hook state and an off-hook state.

12. The apparatus of claim 11, wherein the portion of the handset includes the operative surface.

13. An apparatus for switching a hook switch of a telephone between an on-hook state and an off-hook state, the telephone having a handset and a base with at least one cavity forming a cradle for the handset, the handset having an operative surface including a mouthpiece microphone and an earpiece speaker, the handset having a first surface opposite to the operative surface, the apparatus comprising:

a first arm having a first hook surface;

a second arm having a second hook surface;

wherein the first and second arms are movably mounted in the base and operatively engage the hook switch;

wherein a portion of the handset presses at least one of the first and second hook surfaces when the handset is positioned in the cradle, wherein the portion includes the first surface; and wherein the pressing of a respective hook surface moves the corresponding arm to actuate the hook switch to set the telephone to the on-hook state.

14. An apparatus for switching a hook switch of a telephone between an on-hook state and an off-hook state, the telephone having a handset and a base with at least one cavity forming a cradle for the handset, the handset having an operative surface including a mouthpiece microphone and an earpiece speaker, the handset having a first surface opposite to the operative surface, the apparatus comprising:

a first arm having a first hook surface;

a second arm having a second hook surface;

wherein the first and second arms are movably mounted in the base and operatively engage the hook switch;

wherein a portion of the handset presses at least one of the first and second hook surfaces when the handset is positioned in the cradle;

wherein the pressing of a respective hook surface moves the corresponding arm to actuate the hook switch to set the telephone to the on-hook state; and a cooperative arm pivotally coupled to at least one of the first arm and the second arm, wherein retraction of a respective one of the arms into the base causes the cooperative arm to extend through a cooperative arm slot in the base to engage the handset.

15. The apparatus of claim 14, wherein the cooperative arm in the extended position pivots the handset to apply pressure to the respective hook surface of the respective retracted arm to maintain the respective arm in the retracted position in the base.

16. An apparatus for switching a hook switch of a telephone between an on-hook state and an off-hook state, the telephone having a handset and a base with at least one cavity forming a cradle for the handset, the handset having an operative surface including a mouthpiece microphone and an earpiece speaker, the handset having a first surface opposite to the operative surface, the apparatus comprising:

a first arm having first and second ends, the first end having a first hook surface and the first arm being slidably mounted in the base to slide in a first direction in response to a portion of the handset being positioned in the cradle and pressing and moving the first hook surface, the portion including the first surface; and a second arm pivotally disposed in the base and having:
a first end engaging the hook switch;
a second end operatively coupled to the second end of the first arm whereby sliding motion of the first arm is transformed to pivoting motion of the second arm; and wherein the pivoting motion of the second arm toggles the hook switch to switch between the on-hook state and an off-hook state.

17. The apparatus of claim 16, wherein the portion of the handset includes the operative surface.

18. The apparatus of claim 16, wherein the portion of the handset includes the first surface.

19. The apparatus of claim 16, wherein the base includes an aperture;

the handset includes a slot in the portion pressing the first hook surface; and the first end of the first arm extends through the aperture to engage the slot in the handset to retain the handset substantially adjacent to the base when the base is mounted on a vertical surface.

20. The apparatus of claim 19, wherein the operative surface of the handset includes the slot.

21. The apparatus of claim 19, wherein the first surface of the handset includes the slot.

22. A telephone comprising:

a handset having an operative surface including a mouthpiece and an earpiece and one or more nonoperative surfaces;

a base forming a cradle for the handset and comprising at least a first cavity contoured to support the handset when the handset is positioned in the base in one of its nonoperative surfaces; and a mechanical hook switch for setting the telephone to an on-hook state, the switch being pressed by the handset when the handset is positioned in the first cavity in one of its nonoperative surfaces.

23. The telephone of claim 22, wherein handset has a first nonoperative surface opposite to the operative surface, and wherein the first cavity is contoured to support the handset when the handset is positioned in the first cavity in its first nonoperative surface.

24. The telephone of claim 22, wherein the base comprises a second cavity contoured to support the handset when the handset is positioned in the second cavity in its operative surface.

25. The telephone of claim 24, wherein the mechanical switch comprises a first and second hook surface, the first hook surface extending into the first cavity and being engaged by the first nonoperative surface and the second hook surface extending into the second cavity and being engaged by the operative surface.

26. The telephone of claim 25, wherein the mechanical switch comprises a first arm and a second arm movably mounted within the base, the first arm having at one end thereof the first hook surface and the second arm having at one end thereof the second hook surface.

27. The telephone of claim 26, comprising a cooperative arm pivotally coupled to the first or second arms, wherein engagement of the first or second surface by the handset causes the cooperative arm to extend through a slot in the base to engage the handset.

28. The telephone of claim 27, wherein the cooperative arm in the extended position pivots the handset to apply pressure to the first or second hook surface.

* * * * *